Nov. 16, 1954 M. DEN HERTOG 2,694,753

SYSTEM OF IDENTIFICATION OF THE CALLING LINE IN TELEPHONE SYSTEMS AND THE LIKE

Filed Dec. 29, 1950 5 Sheets-Sheet 1

Inventor
MARTINUS DEN HERTOG

By Robert Harding Jr.
Attorney

Inventor
MARTINUS DEN HERTOG
By Robert Harding Jr.
Attorney

Nov. 16, 1954 M. DEN HERTOG 2,694,753

SYSTEM OF IDENTIFICATION OF THE CALLING LINE IN TELEPHONE SYSTEMS AND THE LIKE

Filed Dec. 29, 1950 5 Sheets-Sheet 3

| NO. | Pa | Pb | Pc | TIME UNITS | NO. | Pa | Pb | Pc | TIME UNITS | NO. | Pa | Pb | Pc | TIME UNITS | NO. | Pa | Pb | Pc | TIME UNITS |
|---|---|---|---|---|---|---|---|---|---|---|---|---|---|---|---|---|---|---|---|
| 00 | 1 | 1 | 1 | 1 | 25 | 1 | 1 | 2 | 31 | 50 | 1 | 1 | 3 | 61 | 75 | 1 | 1 | 4 | 91 |
| 01 | 2 | 1 | 1 | 2 | 26 | 2 | 1 | 2 | 32 | 51 | 2 | 1 | 3 | 62 | 76 | 2 | 1 | 4 | 92 |
| 02 | 3 | 1 | 1 | 3 | 27 | 3 | 1 | 2 | 33 | 52 | 3 | 1 | 3 | 63 | 77 | 3 | 1 | 4 | 93 |
| 03 | 4 | 1 | 1 | 4 | 28 | 4 | 1 | 2 | 34 | 53 | 4 | 1 | 3 | 64 | 78 | 4 | 1 | 4 | 94 |
| 04 | 5 | 1 | 1 | 5 | 29 | 5 | 1 | 2 | 35 | 54 | 5 | 1 | 3 | 65 | 79 | 5 | 1 | 4 | 95 |
| 05 | 1 | 2 | 1 | 7 | 30 | 1 | 2 | 2 | 37 | 55 | 1 | 2 | 3 | 67 | 80 | 1 | 2 | 4 | 97 |
| 06 | 2 | 2 | 1 | 8 | 31 | 2 | 2 | 2 | 38 | 56 | 2 | 2 | 3 | 68 | 81 | 2 | 2 | 4 | 98 |
| 07 | 3 | 2 | 1 | 9 | 32 | 3 | 2 | 2 | 39 | 57 | 3 | 2 | 3 | 69 | 82 | 3 | 2 | 4 | 99 |
| 08 | 4 | 2 | 1 | 10 | 33 | 4 | 2 | 2 | 40 | 58 | 4 | 2 | 3 | 70 | 83 | 4 | 2 | 4 | 100 |
| 09 | 5 | 2 | 1 | 11 | 34 | 5 | 2 | 2 | 41 | 59 | 5 | 2 | 3 | 71 | 84 | 5 | 2 | 4 | 101 |
| 10 | 1 | 3 | 1 | 13 | 35 | 1 | 3 | 2 | 43 | 60 | 1 | 3 | 3 | 73 | 85 | 1 | 3 | 4 | 103 |
| 11 | 2 | 3 | 1 | 14 | 36 | 2 | 3 | 2 | 44 | 61 | 2 | 3 | 3 | 74 | 86 | 2 | 3 | 4 | 104 |
| 12 | 3 | 3 | 1 | 15 | 37 | 3 | 3 | 2 | 45 | 62 | 3 | 3 | 3 | 75 | 87 | 3 | 3 | 4 | 105 |
| 13 | 4 | 3 | 1 | 16 | 38 | 4 | 3 | 2 | 46 | 63 | 4 | 3 | 3 | 76 | 88 | 4 | 3 | 4 | 106 |
| 14 | 5 | 3 | 1 | 17 | 39 | 5 | 3 | 2 | 47 | 64 | 5 | 3 | 3 | 77 | 89 | 5 | 3 | 4 | 107 |
| 15 | 1 | 4 | 1 | 19 | 40 | 1 | 4 | 2 | 49 | 65 | 1 | 4 | 3 | 79 | 90 | 1 | 4 | 4 | 109 |
| 16 | 2 | 4 | 1 | 20 | 41 | 2 | 4 | 2 | 50 | 66 | 2 | 4 | 3 | 80 | 91 | 2 | 4 | 4 | 110 |
| 17 | 3 | 4 | 1 | 21 | 42 | 3 | 4 | 2 | 51 | 67 | 3 | 4 | 3 | 81 | 92 | 3 | 4 | 4 | 111 |
| 18 | 4 | 4 | 1 | 22 | 43 | 4 | 4 | 2 | 52 | 68 | 4 | 4 | 3 | 82 | 93 | 4 | 4 | 4 | 112 |
| 19 | 5 | 4 | 1 | 23 | 44 | 5 | 4 | 2 | 53 | 69 | 5 | 4 | 3 | 83 | 94 | 5 | 4 | 4 | 113 |
| 20 | 1 | 5 | 1 | 25 | 45 | 1 | 5 | 2 | 55 | 70 | 1 | 5 | 3 | 85 | 95 | 1 | 5 | 4 | 115 |
| 21 | 2 | 5 | 1 | 26 | 46 | 2 | 5 | 2 | 56 | 71 | 2 | 5 | 3 | 86 | 96 | 2 | 5 | 4 | 116 |
| 22 | 3 | 5 | 1 | 27 | 47 | 3 | 5 | 2 | 57 | 72 | 3 | 5 | 3 | 87 | 97 | 3 | 5 | 4 | 117 |
| 23 | 4 | 5 | 1 | 28 | 48 | 4 | 5 | 2 | 58 | 73 | 4 | 5 | 3 | 88 | 98 | 4 | 5 | 4 | 118 |
| 24 | 5 | 5 | 1 | 29 | 49 | 5 | 5 | 2 | 59 | 74 | 5 | 5 | 3 | 89 | 99 | 5 | 5 | 4 | 119 |

Inventor
MARTINUS DEN HERTOG

By Robert Harding Jr.
Attorney

Nov. 16, 1954

M. DEN HERTOG 2,694,753

SYSTEM OF IDENTIFICATION OF THE CALLING LINE IN TELEPHONE SYSTEMS AND THE LIKE

Filed Dec. 29, 1950

5 Sheets-Sheet 4

Inventor
MARTINUS DEN HERTOG

By Robert Harding Jr.
Attorney

Inventor
MARTINUS DEN HERTOG
By Robert Harding Jr.
Attorney

United States Patent Office 2,694,753

Patented Nov. 16, 1954

2,694,753

SYSTEM OF IDENTIFICATION OF THE CALLING LINE IN TELEPHONE SYSTEMS AND THE LIKE

Martinus den Hertog, Antwerp, Belgium, assignor to International Standard Electric Corporation, New York, N. Y., a corporation of Delaware

Application December 29, 1950, Serial No. 203,253

Claims priority, application France December 30, 1949

16 Claims. (Cl. 179—18)

The present invention relates to electric signalling systems in which signals made up of impulses situated in time are used.

One feature of the invention comprises an electric signalling system comprising a signal channel, means at one position on said channel for applying a plurality of electrical pulse time signals in turn to said channel, and a plurality of signal responsive means at another point on said channel arranged to respond independently and separately to said successive signals on a time position basis.

Another feature of the invention comprises an automatic telecommunication switching system provided with means for identifying subscribers' lines comprising devices for allocating a periodic cycle of time positions to a group of lines, devices for making available an electric impulse occupying a time position in said cycle which characterises a subscriber's line to be identified, identification devices detecting and registering the time position of said impulse in said cycle as a factor of identification of the subscriber's line, and transmitting channels for transmitting identification impulses to said identification devices.

A further feature comprises an automatic telecommunication exchange comprising means for generating when a substation makes a call a recurring electric pulse in a time position individual to a substation line, said time position forming part of a recurring cycle of time positions allocated to a group of substation lines connected to a group of line finders, means for utilising said pulse for controlling the setting of a line finder to the corresponding substation line, and, means for connecting said recurring pulse to a channel through said line finder for line identification purposes.

Various other features will appear from the following description given as a non-limitative example with reference to the attached drawings in which:

Fig. 1 shows a simplified diagram of a subscriber's line circuit as also the transmitting devices for identification impulses.

Fig. 2 shows a simplified diagram of a cord circuit connecting the finders to the selection stages.

Fig. 3 shows a simplified diagram of a line for response to the subscribers' calls.

Fig. 11 shows the manner in which Figs. 1–8 are to be arranged.

In the following description the contacts associated with a particular relay have been designated by the same letter or the same group of letters as the relay (but in small letters) followed by one of the digits 1–9.

It will be assumed that the connection has been completed, by any suitable means, from the subscriber's line L*a* to the response line L*r* of an operator, through the wires A and B of a finder C*h*, of which there are a plurality, and of the cord circuit C*d* (Figs. 1, 2 and 3); contacts LFHB1, LFHB2 (Fig. 1) and *m*1 (Fig. 2) are assumed to be closed and we will now explain the method of transmitting identification impulses.

Figures 4, 5:
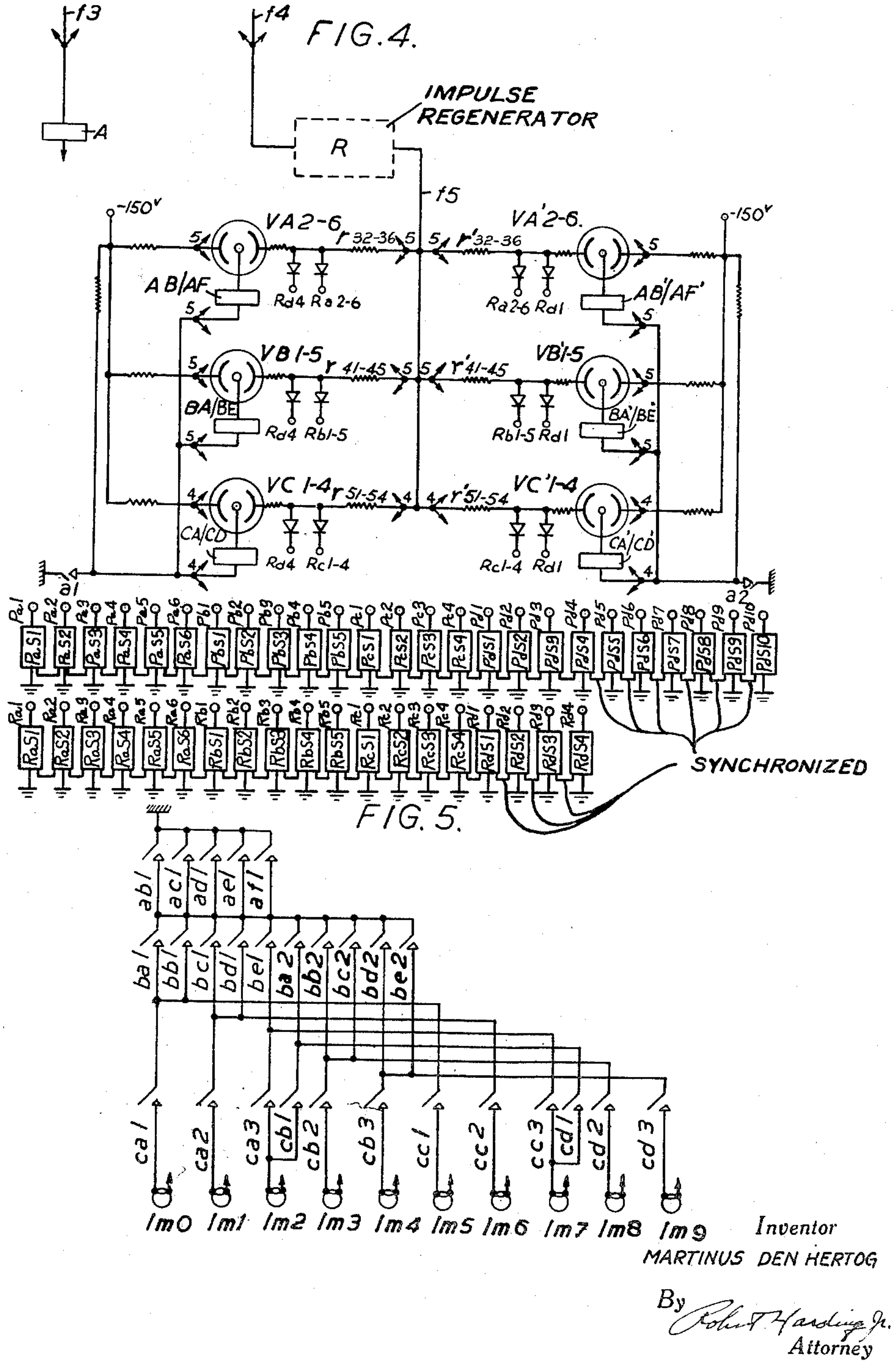
Figs. 4 to 8 show a diagram of a receiving device for identification impulses.
Figure 9:
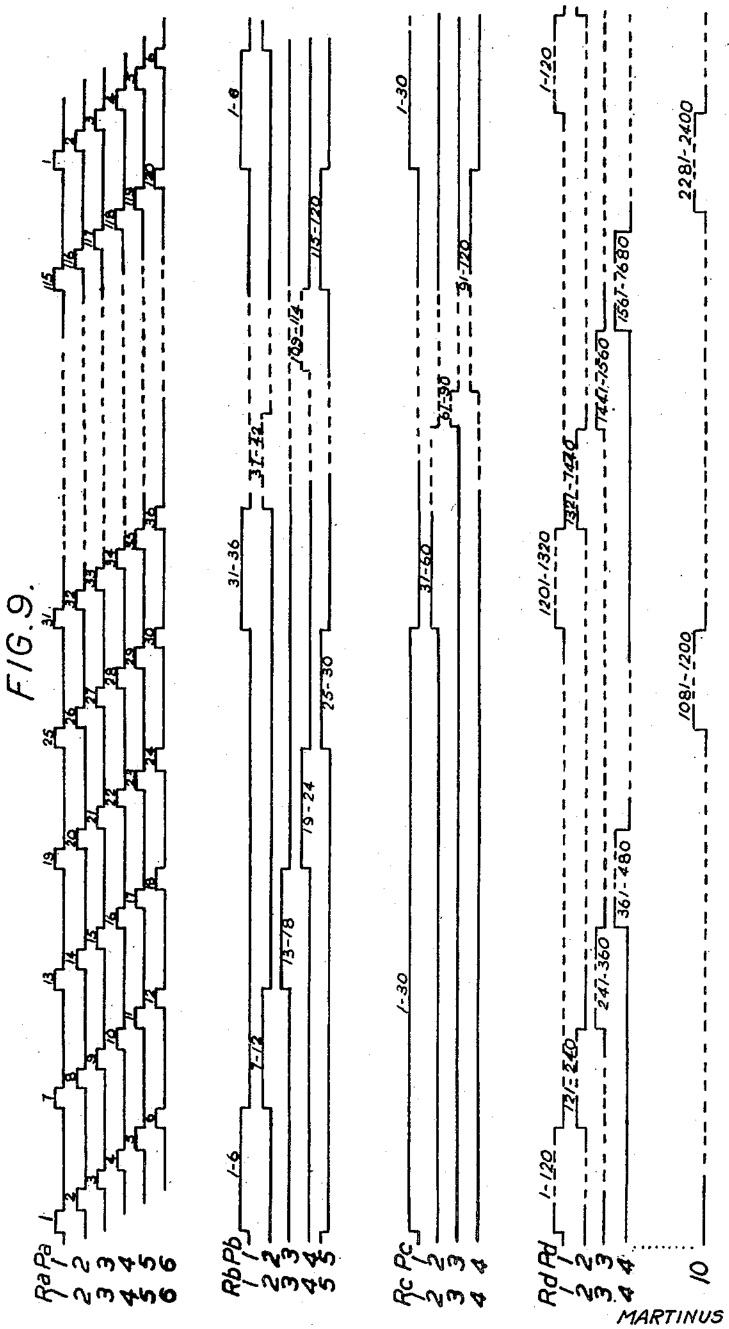
Fig. 9 shows a diagram of the cycles of impulses situated in time employed to constitute the identification signals.

The identification impulses are obtained by first generating a number of repetitive impulses of different time duration and applying combinations of these impulses to various points of the circuit. The sources producing these impulses may be of well known construction and need not be described in detail; they have been illustrated by rectangles in Fig. 4, while a diagram of the impulses they produce is shown in Fig. 9.

Two principal groups of sources, P*a*S, P*b*S, P*c*S, P*d*S, and R*a*S, R*b*S, R*c*S, and R*d*S, have been provided; the pulses produced by the first have been designated by the references P*a*, P*b* . . . and the others by R*a*, R*b* . . . The principal difference between the pulses from these two groups of sources consists in their difference of potential. The sources P*a*S, P*b*S, P*c*S, and P*d*S are provided in order to produce pulses which can be inserted in the grid circuit of an amplifier tube, and their potentials have been determined accordingly. The sources R*a*S, R*b*S, R*c*S, and R*d*S are provided in order to produce pulses which can be applied to the control electrodes of cold cathode tubes, and their potentials have been adapted to the operative conditions of said tubes.

Each of the groups P*a*S and R*a*S comprises 6 sources supplying a succession of impulses together occupying 6 time units in a periodic cycle. The length of each of these impulses corresponds to the duration of the time unit on which the whole system is based and will be referred to in the following description as the "unit" of time.

Each of the two groups P*b*S and R*b*S comprises 5 sources supplying a succession of impulses together occupying 5 time units in a periodic cycle. The length of each of these impulses correspond to 6 time units of the sources P*a*S and R*a*S and the period of these impulses corresponds to 30 of said time units.

Each of the two groups P*c*S and R*c*S comprises four sources of time impulses, the length and period of which respectively correspond to 30 and 120 time units.

Group P*d*S comprises 10 sources the impulses of which correspond to 120 time units and the period to 1,200 time units. These ten sources, like those of the other groups produce time impulses staggered with respect to each other so that the impulse produced by each of the sources comes after that of the preceding source.

Four sources R*d*S have been provided which produce pulses identical with those produced by the sources P*d*S1 . . . 4, with regard to the characteristics relating to time.

It has been assumed, by way of example, that the potential supplied by the sources identified by the initial letter P was —16 v. during the impulses and —40 v. during the intervals between impulses. It has also been assumed that the potential supplied by the sources identified by the initial letter R was —50 v. during the impulses and —100 v. during the intervals between impulses.

Figures 6, 10:
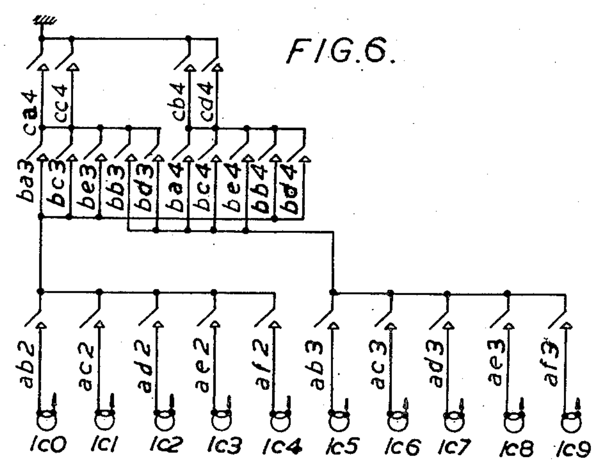
Fig. 10 shows a table indicating the method of utilising the impulses of Fig. 9.

By associating in all possible ways a source P*a*S, a source P*b*S and a source P*c*S (or a source R*a*S, a source R*b*S and a source R*c*S), it is possible to obtain $6 \times 5 \times 4 = 120$ different combinations. In the case of the transmitting device for identification impulses the source P*a*S6 remains unused and then 100 different combinations of pulses are obtained numbered from 00 to 99, as shown in Fig. 10.

First of all, we will explain how the hundreds digit of the calling subscriber is characterized.

The wires *f*1 (Fig. 1) of all the finders C*h* serving the same hundreds are connected on one hand to a resistance *r*1 and on the other hand to three rectifiers placed in parallel *rd*1, *rd*2 and *rd*3. The resistance *r*1 is connected to the source P*d*S4 of time impulses P*d*4; the rectifiers *rd*1, *rd*2 and *rd*3 are respectively connected to the sources P*a*S1, P*a*S2, and P*a*S3 of time impulses P*a*, P*b* and P*c*. This combination characterises the desired hundred. If, for example, it be assumed that the calling subscriber's number is "25–70," the hundreds digit of said subscriber, that is 25, is characterised by the pulse combination P*a*1, P*b*1 and P*c*2, in accordance with the table in Fig. 10. In this case, the rectifier *rd*1 is connected to the source P*a*S1 which supplies the impulse P*a*1, the rectifier *rd*2 to the source P*b*S1 which supplies the impulse P*b*1, and rectifier *rd*3 to the source P*c*S2 which supplies the impulse P*c*2.

Similarly, it will be seen that in the case of a finder giving access to the hundred 74, the rectifiers *rd*1, *rd*2 and *rd*3 will be respectively connected to the sources P*a*S5, P*b*S5, and P*c*S5 which produce, respectively, impulses P*a*5, P*b*5 and P*c*5.

The sources P*a*S, P*b*S, and P*c*S, respectively connected to the rectifiers *rd*1, *rd*2 and *rd*3 are normally at the potential −40 v., but, at different moments, this potential is brought for a brief time to −16 v. The wire *f*1 of the finder C*h* can only be at the potential of −16 v. if the four sources P*a*S, P*b*S, P*c*S and P*d*S4 are simultaneously at said potential of −16 v. In fact, when the pulse P*d*S4 is at the potential −16 v. and one of the sources P*a*S, P*b*S or P*c*S is at the potential of −40 v., current flows from the source P*d*S4 to the source P*a*S, P*b*S, or P*c*S which is at −40 v., through the resistance *r*1 and one of the rectifiers *rd*1 to *rd*3; all the difference of potential between −16 v. and −40 v. is "absorbed" in the resistance *r*1, and wire *f*1 remains at −40 v. On the other hand, if the source P*d*S4 is at −40 v. and one or more sources P*a*S, P*b*S or P*c*S at −16 v., the corresponding rectifier is not conductive and said potential cannot arrive on the wire *f*1, which remains at the potential of the source P*d*S4, that is, −40 v.

The rectifiers *rd*1, *rd*2 and *rd*3 therefore act as potential gates which can open or close the circuit terminating on the wire *f*1; it is only when all these devices cease to be gates on account of the application of potential of −16 v. by the associated sources that the wire *f*1 is itself brought to the potential of −16 v.

It will now be seen that the three sources P*a*S, P*b*S, and P*c*S are connected to the gates in such a way that they permit the application of the potential of −16 v. to the wire *f*1 in a time unit which characterises the hundred subscribers served by the finder concerned, and which time unit is different for each of the groups of finders serving the different hundreds. The method of connection of the different rectifiers which makes it possible to obtain this result for the different groups of finders serving the hundreds "00" to "99" is shown on the table in Fig. 10, which also shows the time units corresponding to the different hundreds. It will be noted that this table lists time units numbered in a series from 1 to 120, arrangements being made so that the sixth position of each group of six does not correspond to any omission, a 100 time units out of 120 being employed for the 100 groups of finders respectively serving the 100 hundreds of subscribers of the exchange.

As has been indicated, the wire *f*1 can only be brought to the potential of −16 v. when the source P*d*S4 is itself transmitting an impulse on −16 v. While the pulses P*a*, P*b* and P*c* characterise the hundred served by the finder concerned, the pulse P*d*4 characterises in the calling subscriber's number the rank of the group formed by the two first digits. Thus, in the case of a finder C*h* connected to the subscriber "25–70," the pulses P*a*1, P*b*1, P*c*2 respectively connected to the rectifiers *rd*1, *rd*2, *rd*3 characterise the hundred 25; the source P*d*4 characterises the rank of the group of digits "25" forming the hundred.

If we number from 1 to 1200 the various time units which can be obtained by combining on the one hand the 120 time units given by the pulses P*a*, P*b*, P*c* and on the other hand the 10 time units of the pulses P*d*, it will be seen that the various time units corresponding to the pulse P*d*4 can be numbered from 361 to 480 (Fig. 9).

In the case of a finder serving the subscriber (25–70, for example), an impulse of −16 v. is sent on the wire *f*1 in accordance with the table of Fig. 10, during time unit No. 31 of the cycle of 120 time units given by the sources P*a*, P*b* and P*c*. As this impulse can only be sent during the periods of transmission of the source P*d*S4, that is to say, during one of the time units 361 to 480 of the cycle of 1200 time units given by the four sources P*a*S to P*d*S, an impulse of −16 v. will only be transmitted on the wire *f*1 during the 31st time unit of the group of 120 time units corresponding to the source P*d*S4, that is to say, in the time unit 360+31=391.

Figures 1, 2, 3, 11:
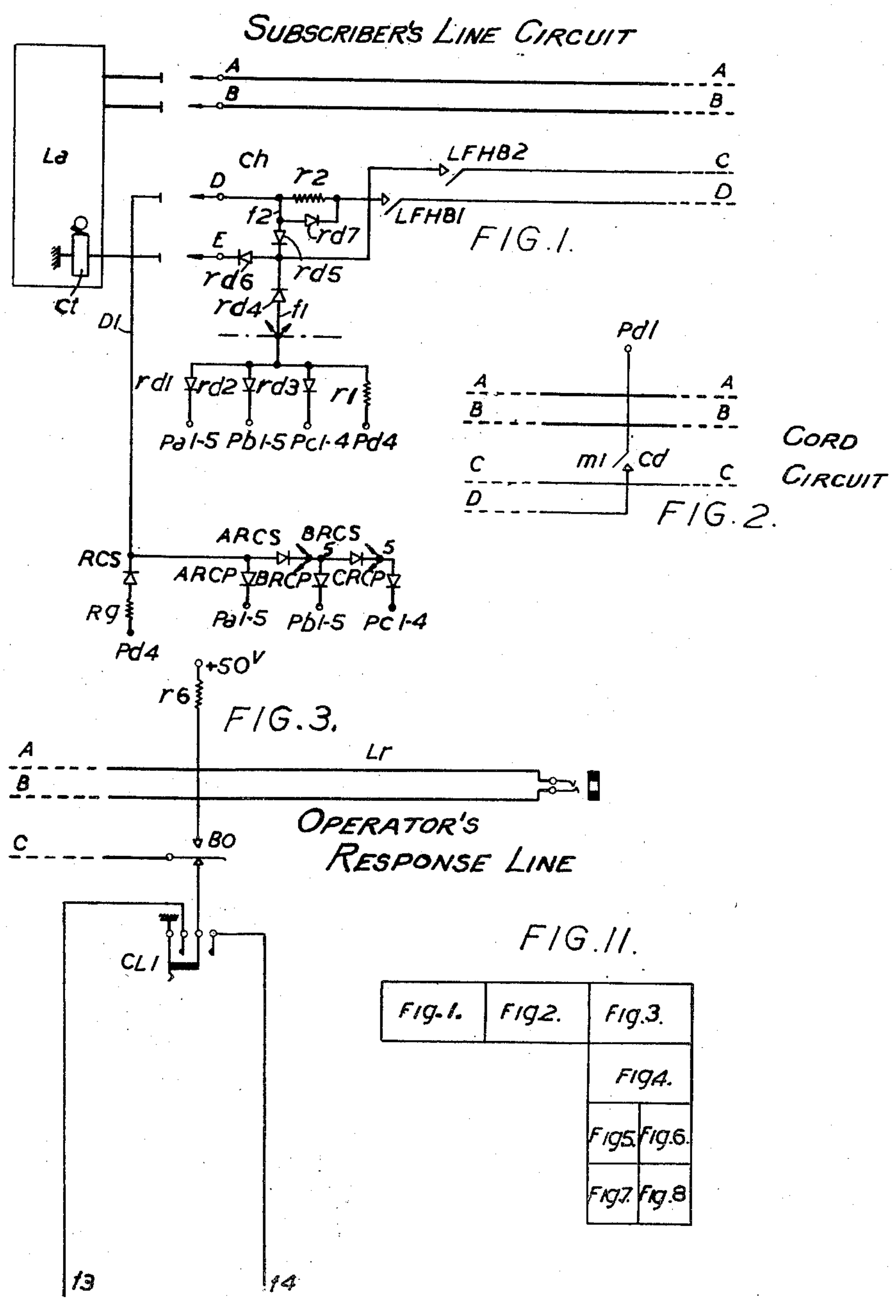

This impulse which characterises both the nature of the two first digits of the calling subscriber and the rank occupied by the group of said digits is transmitted through the following circuit: rectifier *rd*4, make contact LFHB2, wire C through Fig. 2, in order to be finally received on wire C of response line L*r*. The key CL1 and the button B*o*, both being assumed to be in the idle position, this impulse is inoperative.

We will now explain how a subscriber's number is characterised inside each hundred.

The contact *m*1 (Fig. 2), having been assumed to be closed, the source P*d*S1 is then connected to the wire *f*2 (Fig. 1) of the finder C*h* through the following circuit: contact *m*1 (Fig. 2), wire D (Fig. 1), contact LFHB1 closed, resistance *r*2 and wire *f*2.

On the other hand, the subscribers of the same hundred are distributed into 4 groups of 25 subscribers, each of said groups of 25 being itself divided up into 5 sub-groups of 5 subscribers. Each wire D1, individual to a subscriber and corresponding to the wire D of the finder C*h*, is connected to an individual gate composed of rectifiers ARCS, ARCP. The shunt rectifier ARCP is connected to one of the 5 sources P*a*S1 . . . 5 which characterises the subscriber's position in the sub-group.

The five gates ARCS, ARCP respectively corresponding to the five lines of the same sub-group are multipled on the same gate composed of the rectifiers BRCS, BRCP. The shunt rectifier BRCP is connected to that one of the five sources P*b*S1 . . . 5 which characterises the position of the subscriber's sub-group in the group.

Finally, the gates BRCS, BRCP corresponding to the five sub-groups of the same group are in turn multipled on the same gate composed of the rectifier CRCP. Said rectifier is connected to one of the four sources P*c*S1 . . 4 which characterises the position of the group in the hundred.

There are therefore four gates CRCP which respectively correspond to the four groups of 25 subscribers contained in one hundred, 20 gates BRCS, BRCP which respectively correspond to the 20 sub-groups, and finally 100 devices ARCS, ARCP, respectively corresponding to the 100 subscribers.

It will be noted that in the foregoing explanations, the terms "groups" and "sub-groups" relate in a precise manner to groups of 25 lines and sub-groups of 5 lines; in the preamble on the contrary, the term "group" must be taken in the most general sense.

If the subscribers of the same 100 are numbered from "00" to "99," the subscriber "25–70", being the 71st of his hundred, forms part of the third group of 25; inside said group, he forms a part of the 5th sub-group and occupies the rank 1 in said sub-group. The rectifiers CRCP, BRCP and ARCP corresponding to said subscriber will therefore be respectively connected to the sources P*c*3, P*b*5 and P*a*1. Generally speaking the table of Fig. 10, already used, indicates in the first column the subscribers' numbers belonging to the same hundred, and, in the three following columns, the sources P*a*, P*b* and P*c* which respectively have to be connected to the rectifiers ARCP, BRCP and CRCP. The last column gives corresponding time units in a cycle of 120 time units.

From the explanations already given, it is clear that the −16 v. impulse P*d*1 sent by the source P*d*S1 on the right hand terminal of resistance *r*2, can only reach the wire *f*2 if the three sources P*a*S, P*b*S, P*c*S which characterise the subscriber's position in the hundred, simultaneously transmit a −16 v. impulse, that is to say, through the time unit which characterises the two last digits of the subscriber. In any other time unit the −16 v. impulse P*d*1 supplied by the source P*d*S1 is absorbed by one of the sources P*a*S, P*b*S, or P*c*S through one of the rectifiers ARCP, BRCP or CRCP.

While the pulses P*a*, P*b*, P*c* characterise the subscriber's position in the hundred, the pulse P*d*1 characterises in the calling subscriber's number the rank of the group constituting the two last digits.

If the various positions in time, which can be obtained by combining on the one hand the 120 positions given by the pulses P*a*, P*b*, P*c* and on the other hand the 10 positions of the pulses P*d*, are numbered from 1 to 1200, it will be seen that the different positions corresponding to the pulse P*d*1 can be numbered from 1 to 120 (Fig 9).

In the case of the subscriber "25–70," for example, a −16 v. impulse is sent on the wire *f*2 in accordance with the table of Fig. 10, during the time unit No. 85 of the cycle of 120 time units given by the pulses P*a*, P*b* and P*c*. As this impulse can only be sent during the periods of emission of the source P*d*S1, that is to say, during the one of the time units 1 to 120 of the cycle of 1200 time units given by the four sources P*a*S to P*d*S, a −16 v. impulse will be transmitted on the wire *f*2 during the 85th time unit of said cycle of 1200 positions.

This impulse, which characterises both the nature of the two last digits and the rank occupied by the group of said digits, is transmitted through the following circuit: wire *f*2, rectifier *rd*5, contact LFHB2, wire C terminating on the response line of the operator through the cord circuit (Figs. 2 and 3).

Two impulses have therefore been transmitted on the wire C, one characterising the two first digits of the calling subscriber and the other the two last. The order in which these impulses are sent depends upon the time unit in which the connection has been completed, and is of little importance, the only point to be considered being, that these two impulses are sent in different time units which respectively correspond to the periods of emission of the sources P*d*S4 and P*d*S1. These impulses are periodically transmitted as long as the connection remains completed.

It will be noted that during the transmission on the wire *f*1 of the impulse characterising the first two digits of the subscriber, the wire *f*2 is at the potential of —40 v., since the source P*d*S1 is not transmitting any impulse P*d*1 at this moment; the rectifier *rd*5 is not conductive and the impulse transmitted on the wire *f*1 cannot be absorbed through the wire *f*2. It will be seen in the same way that the impulse transmitted on the wire *f*2 can in no case be absorbed through the wire *f*1.

We will now explain the method of reception of the identification signals.

In order to identify the calling subscriber, the operator presses key CL1 (Fig. 3). Relay A (Fig. 4) is energised through the wire *f*3 and through its make contacts *a*1 and *a*2 prepares the operation of the various cold cathode tubes VA2 . . . 6, VB1 . . . 5, VC1 . . . 4, VA′2 . . . 6, VB′1 . . . 5, VC′1 . . . 4. Moreover, the two identification impulses arriving on the wire C (Fig. 3) are transmitted through the back contact of the button B*o*, make contact of key C11 and the wire *f*4 (Fig. 4) to an impulse regenerator R. The latter, which may be of the type described in the patent application, Serial No. 175,704, filed on July 25, 1950, regenerates the impulses which might have been distorted owing to the fact of their passage through the rectifiers, and adapts their potential to the operative conditions of the cold cathode tubes, the latter being intended to operate if a —50 v. potential is applied to their control elctrodes and to remain idle if a —100 v. potential is applied to said electrodes. Furthermore, this regenerator shifts all the impulses by one time unit: thus, an impulse received in time unit No. 1 on the regenerator will be retransmitted in time unit No. 2, and so on. The regenerated impulses are then sent on the control electrodes of the cold cathode tubes through the wire *f*5 and resistances such as *r*32 . . . 36, *r*41 . . . 45, *r*51 . . . 54, *r*′32 . . . 36, *r*′41 . . . 45 and *r*′51 . . . 54.

Each of the 14 tubes VA2 . . . 6, VB1 . . . 5, VC1 . . . 4 is controlled by a rectifier connected on the one hand to control electrode and on the other hand to one of the sources of time impulses R*a*, R*b*, R*c* of which the diagram and function have been indicated on Fig. 9, said tubes only being ionizable in predetermined time units. Thus, the tube VA2 is controlled by the impulse R*a*2 from source R*a*S2, the tube VA3 by the impulse R*a*3 from source R*a*S3, and so on, so that a tube such as VA2 can only be ionised during one of the time units R*a*2 in which the source R*a*S2 is transmitting an impulse, that is to say, according to the table in Fig. 10, in the time units 2, 8, 14, etc. During the other time units, the impulse received on *f*5 is "absorbed" through the resistance *r*32 and the source R*a*S2; the electrode of the tube VA2 remains at —100 v. and the tube cannot operate.

Similarly, the five tubes VB1 . . . 5 are each connected to one of the sources R*b*S1 . . . 5 through a rectifier, so that a tube such as VB1, for example, can only be ionised during one of the groups of time units in which the source R*b*S1 is transmitting an impulse R*b*1, that is to say, in the time units 1 . . . 6, 31 . . . 36, 61 . . . 66, etc.

The tubes VC1 . . . 4 are also controlled by sources R*c*S1 . . . 4, of which the transmission time units R*c*1 . . . 4 are respectively indicated on Fig. 9.

Moreover, the 14 tubes VA2 . . . 6, VB1 . . . 5, VC1 . . . 4, are all controlled by the impulse R*d*4 from the source R*d*S4, so that they can only operate during the time units 361 . . . 480, that is to say, during the time units liable to correspond with the reception of a characteristic hundred impulse.

It is clear from the foregoing that an impulse arriving in any time unit during the period of transmission of the impulse R*d*4 from the source R*d*S4, that is to say, during the period allocated to the reception of the hundreds identification impulse, always causes the ionisation of one tube in each of the three groups VA, VB, VC, the combination of said tubes characterising the hundreds of the calling subscriber.

In the case, for example, in which it has been assumed that the calling subscriber's number was "25–70," the impulse identifying the hundred is transmitted as has been shown in the 31st time unit of the 4th period, that is to say, in the time unit No. 3×120+31=391 of the cycle of 1200 positions given by the combination of the impulses P*a* to P*d*. This impulse, being staggered by one time unit by the regenerator R, is received on the cold cathode tubes in time unit No. 392, that is to say, in the 32nd time unit of the 4th period.

In accordance with the table of Fig. 10, this impulse is received at the moment when only the sources R*a*S2, R*b*S1 and R*c*S2 are transmitting an impulse; the tubes VA2, VB1 and VC2 are ionised, and cause the operation of the relays AB, BA and CB respectively inserted in the anode circuits of said tubes.

Relays AB . . . AF, BA . . . BE, CA . . . CD have a certain number of make contacts which have been shown in Figs. 5 and 6, and which are employed to cause the firing of a thousand lamp 1*m* and that of a hundred lamp 1*c*. In the case concerned, the two following circuits are completed: earth, make contacts *ab*1 (Fig. 5), *ba*2, *cb*1 lamp *lm*2 and battery; earth, make contacts *cb*4 (Fig. 6), *ba*4, *ab*3, *lamp lc*5, battery. The lamp *lm*2 is fired, indicating to the operator that the thousand's digit is a 2; similarly, lamp *lc*5 is fired, indicating that the subscriber's hundred digit is a 5. Ten-thousand's *lm*0 . . . *lm*9 have been provided, that is one for each thousands digit; similarly, ten-hundreds lamps *lc*0 . . . 9 have been provided, that is one for each hundreds digit.

A second group of 14 tubes VA′2 . . . 6, VB′1 . . . 5, VC′1 . . . 4 is mounted like the first, the only difference being that said tubes are all controlled by the impulse R*d*1 from the source R*d*S1 and not the impulse R*d*4 from the source R*d*S4. These tubes thus remain insensitive to the impulses arriving during the period of transmission of the source R*d*S4, that is to say, to the impulses R*a*, R*b*, R*c* which characterise the two first digits of the subscriber. On the other hand, they operate in accordance with the method indicated during the period of transmission of the source R*d*S1 which produces the impulse R*d*1, that is to say, under the effect of the impulses characterising the two last digits of the calling subscriber.

In the case of the subscriber corresponding to the number "25–70," the impulse which characterises the two last digits is transmitted during the 85th time unit of the cycle of 120 time units, and received in the 86th time unit of said cycle. According to the table of Fig. 10, the sources R*a*2, R*b*5 and R*c*3 alone transmit an impulse in the time unit concerned; the tubes VA′2, VB′5 and VC′3 are ionised and cause the operation of the relays AB′, BE′ and CC′ respectively inserted in the anode circuits of said tubes.

Figure 7:
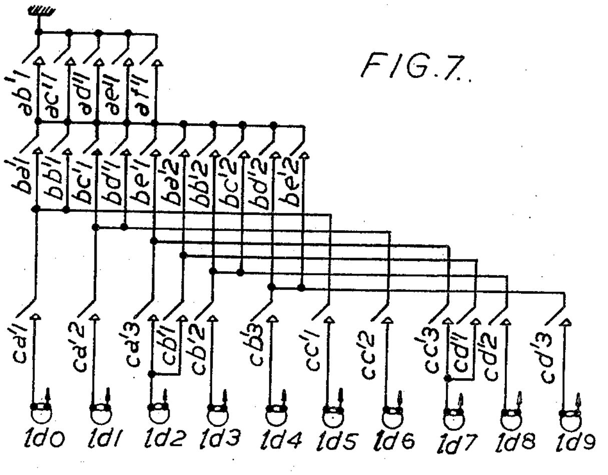
Figure 8:
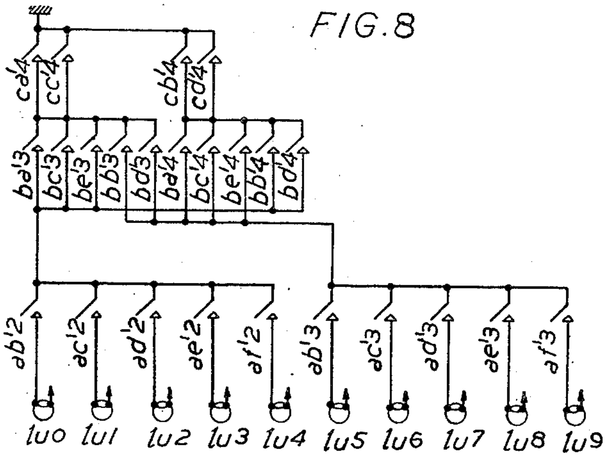

Relays AB′ . . . AF′, BA′ . . .BE′, CA′ . . .CD′ have a certain number of make contacts which have been shown in Figs. 7 and 8, and which are used to cause the firing of a tens lamp *ld* and of a units lamp *lu*.

In the case we considered, the two following circuits are completed: earth, make contacts *ab*′1 (Fig. 7), *be*′1, *cc*′3, lamp *ld*7, battery; earth, make contacts *cc*′4 (Fig. 8), *be*′3, *ab*′2, lamp *lu*0, battery. Lamp *ld*7 is fired, indicating that the calling subscriber's tens digit is a 7; similarly, the lamp *lu*0 is lighted, indicating that the subscriber's unit is a 0. 10 tens lamps have been provided, *ld*0 . . . 9, that is one for each tens digit; similarly, ten units lamps have been provided *lu*0 . . . 9, 1 for each units digit.

It will be noted that the receiving device for identification impulses shown in Figs. 4 to 8 may be common to all the response lines L*r* of the same operator, which is indicated by two multiplying arrows respectively placed on the circuit of relay A and on that of regenerator R.

When the operator has noted the calling subscriber's number, she restores key CL1 to the idle position. Relay A releases opening at *a*1 and *a*2 the anode circuits of all the tubes. The fired tubes are extinguished and the corresponding anode relays release. Lamps *lm*, *lc*, *ld*,

*lu* are extinguished, having their circuits open in each of the pyramids of contacts.

The identification device forming the object of the foregoing descriptions is capable of a certain number of applications.

When the operator wishes to establish a regional or toll call, she does not need to recall the calling subscriber to make sure if the latter has really given his own number; in the case in which said call can be established at once, time is therefore saved. In order to charge the calling subscriber, the operator can according to the particular case, proceed to make out a ticket, or directly enter the charge on the calling subscriber's meter. In the latter case, she presses button B*o* for a moment, a +50 v. potential is sent to the calling subscriber's meter through the following circuit: resistance *r*6, make contact of button B*o*, wire C through cord circuit C*d* (Fig. 2), and finder C*h* (Fig. 1), make contact LFHB2, rectifier *rd*6, contact E of the finder C*h* and meter C*t* of the calling subscriber. The operator then sends to said meter the desired number of impulses, but she can also know said subscriber's number. It is thus possible to envisage giving the subscriber who requests it a detailed statement of the charges which have been directly entered on his meter.

When a subscriber is in a position of wrong call, if, for example, he removes his receiver without dialling, it is possible in accordance with a known method, to provide in the selection stages, a time lag device which after a certain time causes the setting of said stages on the response line L*r* of an operator. The latter presses the identification key C*l*1 for a moment, in order to note the number of the subscriber making the false call.

The identification device can also be used in the case of absent subscribers. When a call arrives intended for an absent subscriber, it terminates in accordance with a known method on an operator's position. Said operator can then, if she wishes, note the number of the calling subscriber which will enable her, when the absent subscriber returns, to indicate to said subscriber all the calls which have been made in his absence.

It is also possible to use the device, according to the present invention, in the case of malicious subscribers, or in time of war in the espionage services, but said device is particularly applicable in the case of the telephone systems described in patent applications Serial No. 171,341, now Pat. No. 2,664,467 and Serial No. 175,704 filed, respectively, on June 30, 1950 and July 25, 1950.

In said system, the various subscribers' lines were successively scanned by the finders and the final selectors by means of time impulses, each line being characterised by an impulse transmitted in a particular time unit in a periodic cycle. According to the inventon one of these impulses may also be employed as one of the factors of identification, then making it possible to identify the rank of the subscriber in the group of lines served by the same finders and the same final selectors.

In the example described in the two above mentioned patent applications, a calling line is characterised by an impulse given by the combination of the three sources P*a*S, P*b*S, P*c*S, that is to say, by an impulse occupying a particular position in a cycle of 120 time units. When said line has been connected to the selection stages, it is characterised by an impulse given by the combination of the four sources P*a*S, P*b*S, P*c*S, and P*d*S1 that is to say, by an impulse occupying a particular position in a cycle of 1200 time units. Said impulse characterises at the same time the rank of the line in the hundred, and the busy condition of said line with respect to the final selectors. According to the invention, this same impulse is transmitted to the receiving device for identification impulses of Figs. 4 to 8, in order finally to give an indication characteristic of the rank of subscriber in the hundred.

The circuit comprising the resistance R*g* (Fig. 1) and the rectifiers R*cs*, *rd*7, has been described in detail in the two above mentioned patent applications.

Of course, the above descriptions have only been given as a non-limitative example and numerous variants and applications may be made without departing from the scope of the invention. It would be possible, for example, to transmit identification impulses corresponding to groups of more than two digits, to employ hot cathode tubes or "thyratrons," to provide different potential values for the impulse sources and to employ arrangements making it possible to place all the receiving devices for identification impulses of the exchange at the disposal of all the operators. In the case of numbers comprising more than 4 digits, it would be possible to transmit a larger number of identification impulses than two, each impulse characterising a combination of two digits.

In the example described, we have considered the case of 120 unit code, obtained by means of 6 sources P*a*S5, sources P*b*S and 4 sources P*c*S, each impulse P*b* produced by one of the sources P*b*S overlapping 6 impulses P*a*, and each impulse P*c* overlapping 5 impulses P*b*. The invention is obviously not limited to this arrangement; various other combinations of sources making it possible to obtain the same result can be used; the number of groups of sources, and the number of sources in each group might be different from those indicated; the relations existing between the lengths of the impulses and the impulse periods of the different sources can be modified.

Finally, it will be noted that in certain existing telephone systems, one single call may be identified at a time in the exchange; in other systems, the number of calls which can be identified simultaneously is limited; a single call can, for example, be identified in a particular time unit in a hundred, or the number of calls which can be simultaneously identified is equal to the number of common control circuits provided in the whole exchange. In the system according to the present invention on the other hand, an unlimited number of operators, or of equipments requiring identification can identify a calling line at the same time; the number of simultaneous identifications is only limited by the number of signal receiving devices shown in Figs. 4 to 8.

What is claimed is:

1. In an automatic telephone system having a plurality of lines arranged in groups, a line finder adapted to select a calling line, and a circuit connected to said line finder, line identification means comprising a plurality of sources of potential pulse trains arranged in successive groups, each pulse train of a group having pulses at a predetermined duration, amplitude, and constant repetition rate, and the pulses of each train in the group being spaced in time from those of every other train, the time duration of the pulses of each train of a group being sufficient to cover a complete repetition cycle of the pulse of a train in a preceding group and the repetition rate of the pulses of each group being a submultiple of that of the pulses of the preceding group, a plurality of gating circuits including unidirectional current carrying devices connected to each line, so poled that current can flow from said line through said devices, a common return connection for said sources, a source of potential having one terminal connected to said common return connection, means for connecting different ones of said pulse train sources to said gating circuits, whereby pulse trains are applied to said lines to characterize said lines, a resistor in said finder connected to said circuit, means for connecting a pulse train source to said resistor, the pulses of said source having a duration overlapping the pulses from said sources connected to said gating circuits, a plurality of electronic devices in said circuit, arranged in groups, each having an anode electrode and a cathode electrode, one of which electrodes is connected to said source of potential and the other to said common return connection, and each electronic device having a control electrode and being adjusted to operate when a potential equal to that of said pulses is applied to said control electrode, means for connecting said control electrodes to said circuit, a second plurality of gating circuits including unidirectional devices connected to said control electrodes, means for connecting different ones of said sources of pulse trains to said second gating circuits whereby pulse trains are applied to said electronic devices, so as to characterize said devices and cause the operation of a predetermined different combination of said devices for each line selected by said line finder, an indicating device, and means connected to said electronic devices and controlled thereby for operating said device in accordance with the combination of electronic devices operated.

2. In an automatic telephone system having a plurality of lines, arranged in groups, a line finder adapted to select a calling line, and a circuit connected to said line finder, the combination as defined in claim 1, in which the pulse train applied to the resistor and one of the pulse trains applied to the electronic devices determine the time periods during which identification is to take place.

3. In an automatic telephone system having a plurality of lines, arranged in groups and sub-groups, a line finder adapted to select a calling line, and a circuit connected to said line finder, the combination, as defined in claim 1, in which the lines of each sub-group have gating circuits connected to corresponding different pulse train sources for characterizing each line in the sub-group, a gating circuit is connected in common to a group of the sub-grops of lines and a different pulse train source is connected to each of said last-mentioned gating circuits for characterizing each group of sub-groups.

4. In an automatic telephone system having a plurality of lines, a line finder adapted to select a calling line, and a circuit connected to said line finder, line identification means comprising a plurality of sources of voltage pulse trains, each pulse train having pulses at a predetermined amplitude and constant repetition rate and the pulses of each train being spaced in time from those of every other train, a common return connection for said sources, means associated with each line for effectively connecting a different one of said sources to said finder, whereby a different pulse train is applied to said finder from each line, a source of potential having the one terminal connected to said return connection, a plurality of electronic devices in said circuit each having an anode electrode and a cathode electrode, one of which electrodes is connected to said return connection and the other to said source of potential, and each having a control electrode and being adjusted to operate when a potential at least as great as that of said pulses is applied to said control electrode, there being one electronic device for each line, a plurality of resistances, there being one for each control electrode and each control electrode being connected through said resistance to said circuit, a unidirectional current-carrying device connected to each of said control electrodes, means for connecting a different one of said sources to each unidirectional current-carrying device, said unidirectional current-carrying device being poled to prevent current flow therethrough when pulses from the associated sources are applied thereto, an indicating device, and means connected in the anode-cathode circuits of said electronic devices and controlled thereby for operating said indicating device in accordance with the electronic device operated.

5. In an automatic telephone system having a plurality of lines, a line finder adapted to select a calling line, and a circuit connected to said line finder, line identification means comprising a plurality of sources of voltage pulse trains, each pulse train having pulses at a predetermined amplitude and constant repetition rate and the pulses of each train being spaced in time from those of every other train, a common return connection for said sources, a first resistor for said finder, a first source of potential, means for connecting said source to said finder through said resistor, the other end of said source being connected to said common return connection, a plurality of first unidirectional current-carrying devices, one connected to each line, means for connecting a different one of said pulse train sources to each first unidirectional current-carrying device whereby a different pulse train is applied to each line, a second source of potential having one terminal connected to said common return connection, a plurality of electronic devices in said circuit, each having an anode and a cathode, said anode and cathode being connected between said second source of potential and said common connection, and each having a control electrode and being adjusted to operate when a potential equal to that of said pulses is applied to said control electrode, there being one electronic device for each line, a plurality of second resistors, there being one for each control electrode and each control electrode being connected through said resistor to said circuit, a second unidirectional current-carrying device connected to each of said control electrodes, means for connecting a different one of said pulse train sources to each second unidirectional current-carrying device, said unidirectional current-carrying device being poled to permit current to flow therethrough from said circuit to the associated source, an indicating device, and means connected in the anode-cathode circuits of said electronic devices and controlled thereby for operating said indicating device in accordance with the electronic device operated.

6. In an automatic telephone system having a plurality of lines, a line finder adapted to select a calling line, and a circuit connected to said line finder, the combination, as defined in claim 5, in which the first source of potential is a pulse train source, the duration of the pulse overlapping the pulses of the other pulse train sources and determining the time during which the identification procedure may be carried out.

7. In an automatic telephone system having a plurality of lines arranged in groups, a line finder adapted to select a calling line, and a circuit connected to said line finder, line identification means comprising a plurality of sources of pulse trains arranged in at least two groups, each pulse train of the first group having pulses at a predetermined amplitude, time duration, and constant repetition rate, and the pulses of each train being spaced in time from the pulses of every other train of that group, each pulse train of the second group having pulses at substantially the same amplitude as those of the first group but having a time duration equal to a complete repetition cycle of the pulses of the first group and a repetition rate which is a submultiple of that of the pulses of the first group, a common return circuit for said sources, a first resistor in said finder, a first source of potential substantially equal to the potential of said pulses, said source having a return circuit connected to said common return circuit, means for connecting said source to said finder through said first resistor associated therewith, a plurality of first unidirectional current-carrying devices, there being one for each line and one for each group of lines, one of said devices being connected to each line and one being connected in common to each group of lines, means for connecting a different pulse train source of said first group to each unidirectional current-carrying device connected to each line, means for connecting a different pulse train source to each of said unidirectional current-carrying devices which are connected in common to each group of lines, said unidirectional current carrying devices being so poled that current can flow from said first current source to said associated pulse train sources during the time between pulses, a second source of potential having one terminal connected to said common return connection, a plurality of electronic devices, each having an anode and a cathode, said anode and cathode being connected between said second source of potential and said common return connection, and each having a control electrode and each being adjusted to operate when a potential at least as great as that of said pulses is applied to the control electrode thereof, said electronic devices being arranged in at least two groups, the number of devices in the first group corresponding to the number of lines in a group of lines and the number of devices in the second group corresponding to the number of groups of lines, a plurality of second resistors, there being one for each electron device, means for connecting the control electrodes of all said devices respectively through said resistors to said circuit, a plurality of second unidirectional current-carrying devices, there being at least two for each electronic device, means for connecting a different pulse train source of the first group of sources to each control electrode of the corresponding electronic devices in the two groups of devices through one of said second unidirectional current-carrying devices, so poled that current can flow through it to said source of pulse trains from said first source of potential between pulses, means for connecting a different source of pulse trains of the second group to all the control electrodes of the electronic devices of each group of said devices through the other second current-carrying devices, so poled that current can flow through them from said first source of potential to the associated pulse train sources between pulses, whereby a combination of electronic devices will be operated when said line finder rests on a calling line which will identify the line, an indicating device, and means connected in the anode-cathode circuit of said electronic devices and controlled thereby for operating said device in accordance with the combination of electronic devices operated.

8. In an automatic telephone system having a plurality of lines arranged in groups, a line finder adapted to select a calling line, and a circuit connected to said line finder, the combination as defined in claim 7, in which the first source of potential is a pulse train source having pulses with a time duration to include a complete repetition cycle of the pulses of the second group of pulse trains and a repetition rate which is a submultiple of the repetition rate of the pulses of said second group, whereby the identity of a calling line is only indicated during one of the pulses of said first mentioned pulse trains from said first source of potential.

9. In an automatic telephone system, the combination, as defined in claim 7, in which there are two indicating devices, one operated under control of the first group of electronic devices and one operated under control of the second group.

10. In an automatic telephone system having a plurality of lines arranged in groups, a line finder adapted to select a calling line, and a circuit connected to said line finder, the combination, as defined in claim 1, in which the connection between the circuit and the line finder includes means for releasably closing said connection and for simultaneously preparing the energization of the electronic devices.

11. An automatic telephone system comprising a plurality of lines, a line finder adapted to select a calling line, an identification circuit comprising a plurality of electronic discharge devices connected in parallel to said circuit and adapted to operate when a predetermined potential is applied to said circuit, means for connecting said identification circuit to said line finder when it has selected a calling line, whereby said calling line is connected to said circuit, a source of potential, a resistor, means including said line finder for connecting said source of potential to said identification circuit through said resistor, means connected to each line for completing a circuit from said source of potential through said resistor and back to said source at all times except a predetermined time interval peculiar to said line in a repetitive cycle of time intervals, there being a different time interval in said cycle allocated to each line, means connected to each discharge device for completing a circuit from said source of potential through said resistor and back to said source at all times except a predetermined time interval in said cycle of time intervals, the said predetermined time interval being different for each device, whereby a particular calling line will cause the operation of a particular discharge device by connecting said source of potential to it at the time interval when neither of said circuit-completing means is completing the circuit through said resistor, an indicating device, and means connected to and controlled by said discharge devices for operating said indicating device in accordance with the discharge device operated.

12. An automatic telephone system, according to claim 11, in which each means for completing the connection through said resistor except at a particular time interval comprises a unidirectional current carrying device connected to the line or discharge device and poled so as to permit current to flow therethrough from the source, and means for applying a potential to the side of said unidirectional current carrying device opposite said source at the particular time interval, said potential being insufficient to block the flow of current therethrough.

13. An automatic telephone system comprising a plurality of lines arranged in groups and sub-groups, a plurality of line finders, arranged in groups, there being at least one line finder for each group of lines, each line finder being adapted to select a calling line in the group with which it is associated, an identification circuit comprising a plurality of electronic discharge devices arranged in first and second groups, each of said groups having first and second sub-groups, and connected in parallel to said circuit and normally adapted to operate when a predetermined potential is applied to said circuit, means for connecting said identification circuit to a line finder which has selected a calling line, whereby said calling line is connected to said circuit, a first source of potential, a first resistor in each line finder, means for connecting said first resistor to said identification circuit when said finder is connected to said circuit, means for connecting said first source of potential to the other end of said first resistor, means connected to each line for completing a circuit from said first source of potential through said first resistor and back to said first source at all times except a predetermined time interval in a first repetitive cycle of time intervals, which time interval is peculiar to the position of said line in its sub-group, there being a different time interval in said cycle allocated to each line of a sub-group, corresponding lines of the different sub-groups having the same time interval, means also connected to each line for completing a circuit from said first source of potential through said first resistor and back to said first source at all times except a predetermined time interval in a second repetitive cycle of time intervals, which time interval is peculiar to the sub-group to which said line belongs, there being a different time interval of said second cycle allotted to each sub-group and the duration of each time interval being equal to the repetitive period of said first cycle, means connected to each discharge device of the first sub-group of each group of said discharge devices for completing a circuit from said first source of potential through said first resistor and back to said first source at all times except a predetermined time interval in said first repetitive cycle of time intervals, which time interval is peculiar to the position of said device in the sub-group, there being a different time interval in said cycle allocated to each device in said sub-group, means connected to each discharge device of said second sub-group of each group of discharge devices for completing a circuit from said first source of potential through said first resistor and back to said first source at all times except a predetermined time interval in said second repetitive cycle of time intervals, which time interval is peculiar to the position of said sub-group in the group, there being a different time interval in said cycle allocated to each group, said first source of potential comprising means for producing a potential during a first predetermined time interval in a third cycle of repetitive time intervals of which each time interval has a duration at least as long as the period of said second cycle of time intervals, said potential thus being applied through said resistor to said identification circuit, means connected to said first group of discharge devices for completing a circuit from said first source of potential through said first resistor and back to said first source at all times except during said first time interval in said third cycle, a second source of potential, a second resistor in each line finder, means for connecting said second resistor to said identification circuit when said finder is connected to said circuit, means for connecting said second source of potential to the other end of said second resistor, means connected to each line-finder for completing a circuit from said second source of potential through said second resistor and back to said second source at all times except a predetermined time interval in said first repetitive cycle of time intervals, which time interval is peculiar to the position of said finder in its group, there being a different time interval in said cycle allocated to each finder of a group, corresponding finders of the different groups having the same time intervals, means also connected to each finder for completing a circuit from said second source of potential through said second resistor and back to said second source at all times except a predetermined time interval in said second repetitive cycle of time intervals, which time interval is peculiar to the group to which said finder belongs, there being a different time interval of said second cycle allotted to each group, said second source of potential comprising means for producing a potential during a second predetermined time interval in said third cycle of repetitive time intervals, said potential thus being applied to said identification circuit through said second resistor, means at all the discharge devices in said second group for completing a circuit from said second source of potential through said second resistor and back to said second source except during said second time interval in said third cycle of repetitive time intervals, an indicating device, and means connected to and controlled by said discharge devices for operating said indicating device in accordance with the combination of discharge devices operated.

14. An automatic telephone system, as defined in claim 11, in which each means for completing the connection through the resistor, except at a particular time interval comprises a unidirectional current carrying device connected to the line or discharge device and poled so as to permit current to flow therethrough from the source, and means for applying a potential to the side of said unidirectional current carrying device opposite said source at the particular time interval, said potential being sufficient to block the flow of current through said device.

15. An automatic telephone system comprising a plurality of lines arranged in groups, a plurality of line finders, there being at least one line finder for each group of lines, an identification circuit comprising a plurality of electronic discharge devices connected in parallel and adapted to operate when a predetermined potential is applied to said circuit, means for causing a line finder to select a calling line in the group of lines with which it is associated, means for connecting said identification circuit to a line finder which has selected a calling line, a source of potential, a resistor in said line finder, means for connecting said source of potential to said identification circuit through said resistor, means connected to each line finder for completing a circuit from said source of potential through said resistor back to said source at all times except a predetermined time interval peculiar to said line finder in a repetitive cycle of time intervals, there being a different time interval in said cycle allocated to each line finder, means connected to each discharge device for completing a circuit from said source of potential through said resistor back to said source at all times except a predetermined time interval in said cycle of time intervals, the said predetermined time interval being different for each device, whereby a particular line finder will cause the operation of a particular discharge device by connecting said source of potential to it at the time interval when neither of said circuit-completing means is completing the circuit through said resistor, an indicating device, and a means connected to and controlled by said discharge devices for operating said indicating device in accordance with the discharge device operated.

16. An automatic telephone system, as defined in claim 15, in which the source of potential is a source producing a voltage pulse train of repetitive pulses whose duration is at least equal to the repetition period of the time intervals during which the circuit through the resistor from said source is not completed.

References Cited in the file of this patent

UNITED STATES PATENTS

| Number | Name | Date |
|---|---|---|
| 2,484,612 | Dehn | Oct. 11, 1949 |